United States Patent [19]

Matsumoto et al.

[11] Patent Number: 5,026,289
[45] Date of Patent: Jun. 25, 1991

[54] CLOCK SPRING INTERCONNECTOR FOR STEERING

[75] Inventors: Mitsunori Matsumoto; Hironori Kato, both of Miyagi, Japan

[73] Assignee: Alps Electric Co., Ltd., Tokyo, Japan

[21] Appl. No.: 425,143

[22] Filed: Oct. 20, 1989

[30] Foreign Application Priority Data

Dec. 14, 1988 [JP] Japan .............................. 63-161261[U]

[51] Int. Cl.⁵ .............................................. H01R 35/04
[52] U.S. Cl. ......................................... 439/15; 439/164
[58] Field of Search ........................ 439/15, 164, 4, 14, 439/13

[56] References Cited

U.S. PATENT DOCUMENTS 3,028,445  4/1962  Hurley ................................... 174/86
3,426,308  2/1969  Andersen et al. .
4,540,223  9/1985  Schmerda et al. ..................... 439/15
4,836,795  6/1989  Schauer ................................. 439/15

Primary Examiner—Gary F. Paumen
Attorney, Agent, or Firm—Guy W. Shoup; Paul J. Winters

[57] ABSTRACT

A clock spring interconnector connects a fixed member and a movable member using a flexible cable. The clock spring interconnector includes a first direction winding portion, a second direction winding portion and a turned back portion therebetween, the first direction winding portion having an end secured to one side of one of the fixed member and the movable member, the second direction winding portion having an end secured to another side of the other one of the fixed member and the movable member.

4 Claims, 4 Drawing Sheets

CLOCK SPRING INTERCONNECTOR FOR STEERING

BACKGROUND OF THE INVENTION

1. Field of the Invention

The present invention relates to a clock spring interconnector, which is used for a steering system of an automobile, for connecting a fixed member and a movable member using a flexible cable.

2. Prior Art

A clock spring interconnector is used to provide a connection between a fixed member and a movable member, in which one end of a flexible cable is secured to the fixed member and the other end thereof is secured to the movable member so that the movable member is rotated through a predetermined amount with respect to the fixed member. The clock spring interconnector is used, for example, as an electric connecting device in a steering system of an automobile.

In prior art, the flexible cable is received within a cable receiving portion provided between the fixed member and the movable member in order to prevent the movable member from being unrotatable by the presence of the flexible cable. The cable is wound spirally between an outer ring wall formed on one side of either fixed member or movable member and an inner ring wall formed on the other, so that when the movable member is rotated, the cable can be wound on the inner ring wall side or rewound on the outer ring wall side. In this case, the outermost portion of the flexible cable in the wound state is secured to the outer ring wall side, and the innermost peripheral portion of the flexible cable is secured to a part on the inner ring wall side and the portions are led out of the respective sides.

In the case where the cable is received into the cable receiving portion in the state where the cable is spirally wound as mentioned above, a space is needed to enable expansion and contraction of a winding diameter of cable between the outer ring wall and the inner ring wall. Particularly, the amount of expansion and contraction of the winding diameter of the cable varies with the amount of allowable rotation of the movable member. In the case where the amount of allowable rotation of the movable member is set to be large, it is necessary to have a wide spacing between the outer ring wall and the inner ring wall so as to meet that requirement, thus giving rise to an inconvenience of making a clock spring interconnector large as a whole.

Furthermore, when the cable in spiral form is received into the cable receiving portion, the opposite ends thereof are positioned in one inner peripheral side of the fixed member and the movable member and in the outer peripheral side. Therefore, the position of the cable brought out to the clock spring interconnector is restricted thereby, thus posing a disadvantage that the cable cannot be removed at the desired position.

Furthermore, the cable in the clock spring interconnector cannot be brought out normally radially from the diametral direction thereof but can be removed from the thickness direction, that is, from the vertical direction. Therefore, where a wide cable such as a flat cable is used, the cable is received with its width directed up and down. Accordingly, when the cable is removed, the cable has to be bent through approximately 45 degrees. This causes the removal of the cable to be very cumbersome and the bent portion of the cable is possibly damaged.

SUMMARY OF THE INVENTION

The present invention has been accomplished in view of the foregoing. It is an object of the present invention to provide a clock spring interconnector in which a cable can be received in an extremely compact manner, and a cable can be easily brought out from a suitable position of a movable member and a fixed member.

For achieving the above-described object, the present invention provides a clock spring interconnector including a fixed member, a movable member rotatable engaged with the fixed member in such a manner that a space is defined between the fixed member and said moveable member. In said space, a first direction winding portion of a flexible cable is wound so that the cable is concentrically wound in the first direction. Additionally, a second direction winding portion of the flexible cable is wound in a second direction opposite to the first direction in the space. Moreover, a cable turned-back portion of the flexible cable is located in the space between the first direction winding portion and the second direction winding portion. The invention is characterized in that an end of said first direction winding portion is secured to a first side of one of the fixed member and the movable member, and an end of the second direction winding portion is secured to a second side of the other of the fixed member and the movable member.

With the aforementioned arrangement, when the movable member is rotated relative to the fixed member, the turned-back portion of the cable is merely moved in the peripheral direction, and the cable itself is not displaced in the direction of being wound or rewound within the cable receiving portion, and the winding diameter is not displaced to be expanded or contracted. Accordingly, it is not necessary to provide a spacious margin for receiving the cable to enable displacement of the cable. Therefore, the shape of the clock spring interconnector can be miniaturized and formed into a compact configuration. Moreover, if the end of the cable is directed in a required direction, the cable can be brought out from a suitable vertical position in the fixed member and the movable member. At the removing position, the cable need not be bent. Therefore, the removing work can be facilitated, and the cable is not possibly damaged.

BRIEF DESCRIPTION OF THE DRAWINGS

FIG. 1 is an external view of a clock spring interconnector;

FIG. 2 is a half sectional view taken on line II—II of FIG. 1;

FIG. 3 is an explanatory view showing the state of receiving the cable; and

DESCRIPTION OF THE PREFERRED EMBODIMENTS

Figure 1:
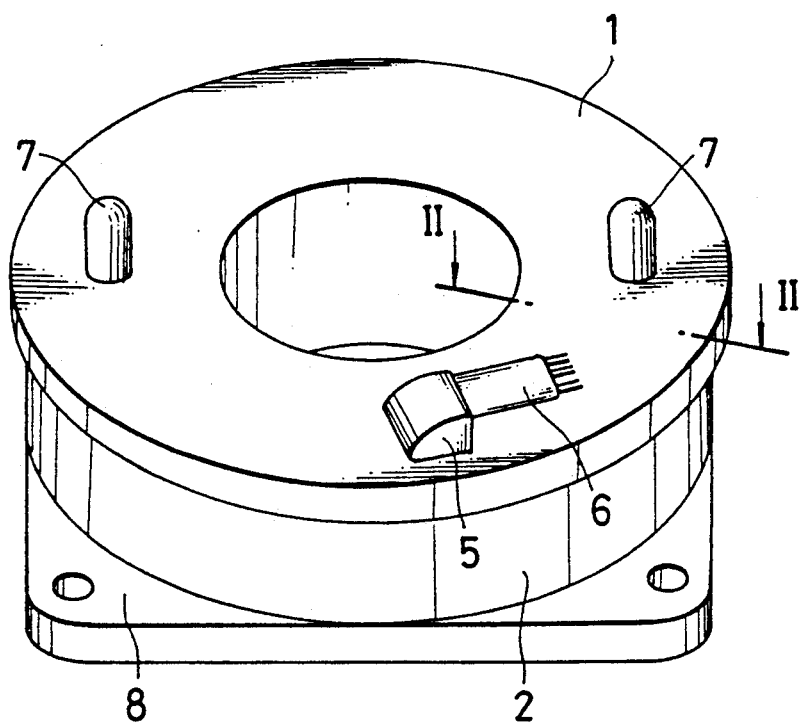
FIGS. 1 to 3 shows the first embodiment of the present invention.
Figure 2:
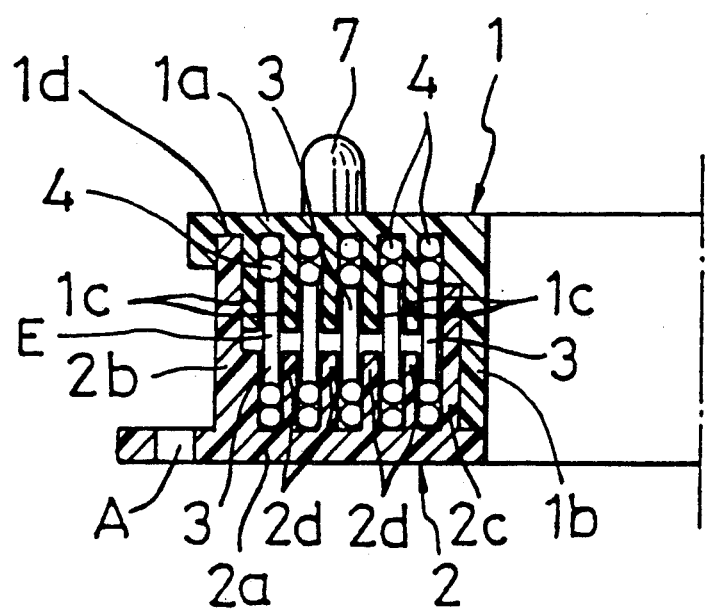
Figure 3:
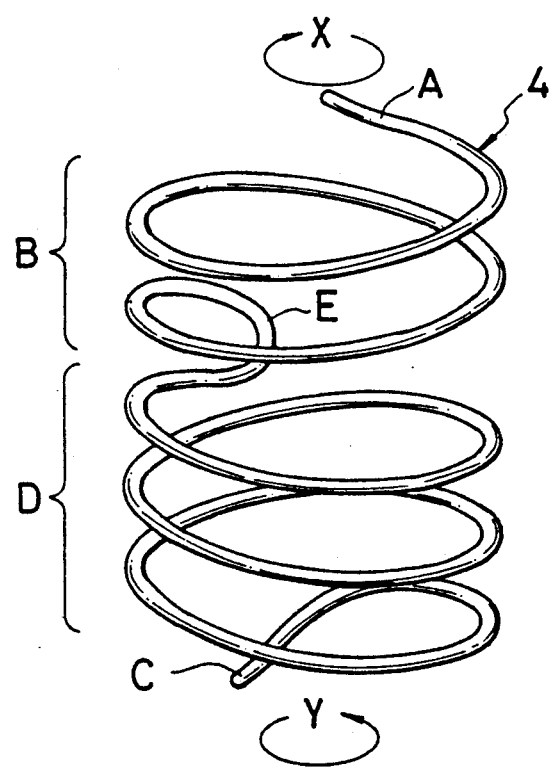

FIGS. 1 to 3 show a first embodiment of the present invention. Referring now to FIGS. 1 and 2, there are shown a movable member 1 and a fixed member 2. The movable member 1 comprises a top plate 1a, an inner peripheral wall 1b, and a plurality of diaphragms 1c concentric with the inner peripheral wall 1b. The fixed member 2 comprises a bottom plate 2a, an outer peripheral wall 2b and an inner peripheral wall 2c, and a plurality of diaphragms 2d, each formed at a position corresponding to a plurality of diaphragms 1c of the movable member 1. Both the members are connected so that the inner peripheral wall 2c of the fixed member 2 is in sliding contact with the inner peripheral wall 1c of the movable member 1, and the outer peripheral wall 2b is fitted into an outer peripheral receiving portion 1d of the movable member 1.

In the state wherein the movable member 1 and the fixed member 2 are connected, a plurality of cable receiving portions 3 are annularly formed between the diaphragms 1c, 1c and 2d, 2d adjacent to each other, between these diaphragms and the inner peripheral wall 1b of the movable member 1 and between the fixed member 2 and the outer peripheral wall 2b. Each cable receiving portion 3 has a width slightly larger than the diameter of each cable 4 and houses therein a cable 4 having a flexibility. Each cable 4 comprises round electric wires, one end of the cable is secured to the top plate 1a of the movable member 1. An end of each cable is brought out through a removing portion 5 formed in the top plate 1a. A resin mold is applied to an end portion of each cable 4 which extend out removing portion 5 and the portions are bundled as a cable bundle 6. Each cable 4 has the other end secured to the bottom plate 2a of the fixed member 2, and this end is brough out of the bottom plate 2a, which is likewise bundled as a cable bundle with the resin mold. In the figures, reference numeral 7, 7 denote a rotating knob for the movable member 1, and 8 a mounting portion of a cable reel (not shown).

Each cable 4 is received into one of the cable receiving portions 3 in the following manner. That is, as shown in FIG. 3, each cable has a one direction winding portion B wound concentrically in one or plural turns in a direction of arrow X from a fixed portion A toward the movable member 1, and another direction winding portion D wound concentrically in one or plural turns in a direction of arrow Y opposite to the aforesaid direction winding portion B from a winding portion C toward the fixed member 2. A turned-back portion E of the cable 4 is formed between these winding portions B and D.

The present embodiment is constructed as described above. Each cable 4 is received into a respective one of the cable receiving portions 3 within the movable member 1 separated from the fixed member 2. The cables 4 are wound in the direction of X from the fixed portion A side to the movable member 1, and are wound in the direction of Y opposite thereto from the fixed portion C side to the fixed member 2. In the winding, each cable is defined by the width of the cable receiving portion 3, and therefore, the winding portions B and D of each cable are approximately in the concentrical state having the same diameter. A boundary portion E between the winding portions B and D is turned back, as illustrated in FIG. 3.

After each cable 4 has been received into a respective one of the cable receiving portions 3, the movable member 1 is connected to the fixed member 2 so as to be fitted therein. Thereby, when the movable member 1 is rotated, each cable 4 within the cable receiving portion 3 takes on a circular motion about turned-back portion E in the same direction as the rotational direction of movable member 1. No displacement of each cable occurs in that each cable is wound toward the center and away from center. Accordingly, the cable receiving portion 3 will suffice to have a width slightly larger than the diameter of each cable 4. When the movable member 1 is rotated, each cable 4 is not inflated in the winding direction, that is in the vertical direction. Accordingly, the dimension of the clock spring interconnector in the radial direction and the dimension thereof in the thickness direction can be minaturized and formed into a compact configuration.

Moreover, since each cable 4 is received into one of the cable receiving portions 3 in a state wherein the cable is merely wound, the end of the cable 4 can be directed in a suitable direction. As the result, the end portion of each cable 4 can be formed at a suitable position in the surface of the top plate 1a of the movable member 1 and the bottom plate 2a of the fixed member 2. In removing each cable 4, the cable 4 need not be bent, and therefore, the removal thereof is facilitated, and the cable 4 is not possibly damaged.

Figure 4:
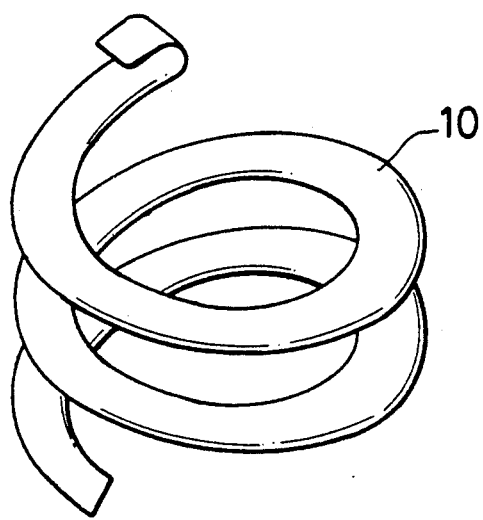
FIGS. 4 and 5 are respectively explanatory views of the state of receiving the cable according to the second and third embodiments of the present invention.
Figure 5:
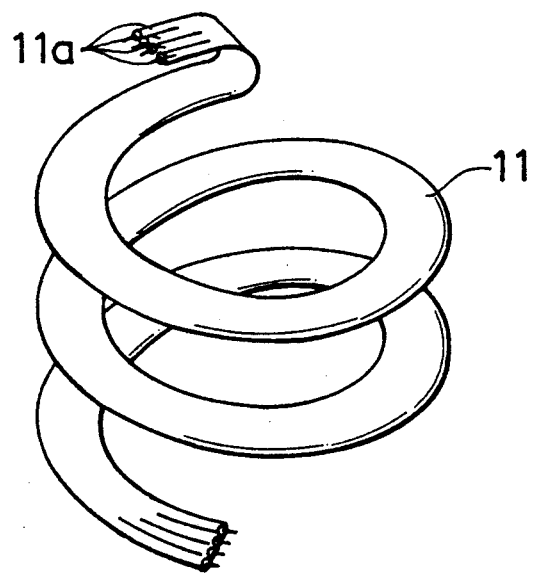

Next, a flat cable 10 having a larger width than cable 4, as shown in FIG. 4, and a flat cable 11 of the type in which a plurality of round electric wires 11a are connected, as shown in FIG. 5, can be received into the cable receiving portions by winding cables 10 and 11 in advance so as to form the first direction winding portion, the second direction winding portion and the turned-back portion.

As described above, according to the present invention, the flexible cable is provided with the first direction winding portion wherein the cable is concentrically wound in a first direction, the second direction winding portion wherein the cable is concentrically wound in the second direction opposite to the first direction, and the turned-back portion of the cable between both the winding portions. Therefore, the cable can be received into the cable receiving portion in an extremely compact manner, thus enabling miniaturization and compactness of the whole clock spring interconnector. In addition, the cable positions in the movable member and the fixed member can be freely set without interfering with other members. The cable need not be bent, thus eliminating possible damage to the cable.

What is claimed is:

1. A clock spring interconnector including a fixed member; a movable member rotatably engaged with said fixed member such that a space is defined between said fixed member and said movable member; a first direction winding portion of a flexible cable wound so that the cable is concentrically wound in said first direction around one of said fixed member and said movable member at a constant diameter; a second direction winding portion of said flexible cable concentrically wound around one of said fixed member and said movable member at a constant diameter in a second direction opposite to said first direction; and a cable turned-back portion of said flexible cable located between said first direction and said second direction winding portions in said space, characterized in that a first end of said first direction winding portion is secured to a first side of one of said fixed member and said movable member, and a second end of the second direction winding portion is secured to a second side of the other one of said fixed member and said movable member.

2. A clock spring interconnector according to claim 1, wherein said movable member comprises a top plate, an inner peripheral wall, and a plurality of diaphragms provided concentrically with said inner peripheral walls while said fixed member comprises a bottom plate, an outer peripheral wall, an inner peripheral wall and a plurality of diaphragms formed at positions corresponding to positions of said plurality of diaphragms of said movable member, and said movable member and said fixed member are connected so that said inner peripheral wall of said fixed member is in sliding contact with said inner peripheral wall of said movable member, and said outer peripheral wall of said fixed member is fitted into an outer peripheral receiving portion of said movable member.

3. A clock spring interconnector according to claim 2, wherein one of said first end and said second end of said flexible cable is led outwardly from a suitable position of said bottom plate of said fixed member, and the other one of said first end and said second end is led outwardly from a suitable position of said top plate of said movable member.

4. A clock spring interconnector according to claim 1, wherein one of said first end and said second end of said flexible cable is led outwardly from a suitable position of said fixed member and the other one of said first end and said second end is led outwardly from a suitable position of said movable member.

* * * * *